INVENTOR.
SHIRO OKAMURA
BY
Hopgood & Calimafde
ATTORNEYS.

INVENTOR.
SHIRO OKAMURA
BY
Hopgood & Calimafde
ATTORNEYS.

United States Patent Office 3,425,002
Patented Jan. 28, 1969

3,425,002
VARIABLE DELAY DEVICE

Shiro Okamura, 26 Nichome, Shiba Shirokane, Daimachi, Minatoku, Tokyo, Japan

Filed Nov. 3, 1964, Ser. No. 408,641
Claims priority, application Japan, Nov. 7, 1963, 38/60,018
U.S. Cl. 333—30 2 Claims
Int. Cl. H03h 7/30

ABSTRACT OF THE DISCLOSURE

An elongated medium for propagating an elastic wave is provided with a means for launching a signal at one end and means for receiving the delayed signal at the other end. The device is further provided with a means for applying the magnetic or electric field thereto while simultaneously varying the mechanical stress, thereby producing a variable delay between the input and output.

This invention relates to an arrangement for variably delaying an incident elastic-wave or electric signal in response to an electrical or physical control manifestation.

In various applications it is often necessary to provide a variable delay, the value of which may be made to undergo reasonably large excursions with immediate response. Examples of such uses are in MTI radar for adjusting the delay of the echo pulse in response to variation of the scanning period; in computers for compensating storage drum irregularity; in TV frequency band compression, of the type where differential signals between consecutive horizontal line periods are employed, for adjusting the time lag of the delayed signal; and in wide band tape recorders for compensating the jitter of the rotating head and wow and flutter of the tape.

While conventional arrangements are available to operably effect the approximate result desired, each such arrangement exhibits significant disadvantages. For example, lumped-constant delays, while they may be elementally cascaded and switched in order to effect the desired delay, become extremely cumbersome when large order delays are called for. Moreover, switching introduces unwanted discontinuities and continuous variation is not possible. Non-linear magnetic cores of ferromagnetic delay networks are also bulky and moreover exhibit poor delay variation. Needless to say, other conventional variable delay devices raise similar objections.

Accordingly, it is the object of this invention to provide a relatively small delay device of simple and inexpensive construction which is capable of introducing continuously and immediately variable delays of a substantial amount.

The invention is predicated upon materials (generally ferromagnetic, ferroelectric or piezoelectric, however, there are other categories) whose Young's modulus of elasticity varies with the impressed magnetic and/or electric field, or with the applied stress, or with a combination of the foregoing. Thus, for example, a variation in the magnetic field impressed on a ferromagnetic nickel or iron rod results in a variation of its elastic constant, as does the variation of the electric field on a ferroelectric barium titanate rod. In these instances, the variations are presumably the result of magnetostriction and electrostriction, respectively. A similar effect has also been observed in a ferrite member or such a ferromagnetic and ferroelectric member as made by molding or sintering a mixture of a ferrite and a titanate ceramic, by varying either or both of the magnetic and electric fields impressed thereon. It is also possible to considerably vary the elastic constant by varying the tension, or other external mechanical stress applied to a member which may or may not be ferromagnetic or ferroelectric, but which is preferably so in view of the generally greater variation of the elastic constant which can be achieved by the simultaneous application of stress and varying field.

When now an elastic wave is launched in media such as those described above, the propagation velocity $v$ of the wave may be defined in terms of its Young's modulus E as follows:

$$v=\sqrt{E/d} \qquad (1)$$

where $d$ is the density of the medium. On the other hand, the time T necessary for the elastic wave of the velocity $v$ to travel a length $l$ of a path in the medium is represented by $$T=l/v \qquad (2)$$

the time being the delay given to the elastic wave and hence to any input signal having been converted into the elastic wave. From the Equations 1 and 2 it may be seen that:

$$T=l\sqrt{d/E} \qquad (3)$$

It is apparent from Equation 3 that a variation in the elastic constant E, due to an impressed magnetic or electric field or the applied stress, results in a depending variation, in the delay given to an input signal. This variation in delay is large in amount as will be described hereinafter and is moreover promptly respondent to the variation in the magnetic or electric field (but not so rapidly to that of stress due merely to a slow response nature of means for applying stress to the medium).

The above equations are applicable to whole frequency region of the elastic wave such as from audible-sonic wave to ultrasonic wave when the elastic wave is caused to travel in the medium in the form of a substantially pure longitudinal wave. Whereas, they are valid only for sufficiently lower frequency region than the cut-off frequency when the elastic wave is caused to travel by the other mode of excitation, where the cut-off effect prevails in the manner to be mentioned below.

The propagation velocity of the elastic wave through a wave-guiding member may vary largely when the wavelength of the elastic wave is near the cut-off wavelength in the member. This fact is similar to that observed in the propagation of an electromagnetic wave through a waveguide, where the group velocity $vg$ of the wave is given by $$vg=c\sqrt{1-(\lambda/\lambda c)2} \qquad (4)$$

where $c$ is light velocity, $\lambda$ is guide wavelength, and $\lambda c$ is the cut-off wavelength, which as is well known depends on the size of the waveguide. In the case of the propagation of an elastic wave, the cut-off wavelength varies by virtue of a change in the effective size of the member, introduced when the elastic constant of the member varies in response to the impressed magnetic or electric field or the applied stress. Accordingly, the propagation velocity of the elastic wave and hence the delay will vary quite largely (in a similar relation to Equation 4) if the manner of excitation is so elected as to provide the cut-off wavelength effect the wave length of the elastic wave is selected near the cut-off wavelength, and the magnetic field, electric field, and/or the stress is subjected to variation. Since the cut-off wavelength is generally very short, an ultrasonic wave is adequate to put this near-cut-off-wavelength effect into practice. If the elastic wave to be delayed in such manner contains low-frequency component, it is therefore recommended to raise its frequency by well-known modulation technique. As will be easily understood, it is possible to achieve larger variation of the delay by this near-cut-off-wavelength effect being added to the previously mentioned Young's modulus effect by suitably selecting the size and shape of the member, manner of excitation thereof, and the wavelength of the elastic wave.

The above mentioned and other features and objects of this invention and the manner of attaining them will become more apparent and the invention itself will best be understood by reference to the following description of embodiments of the invention taken in conjunction with the accompanying drawings wherein.

Figure 1:
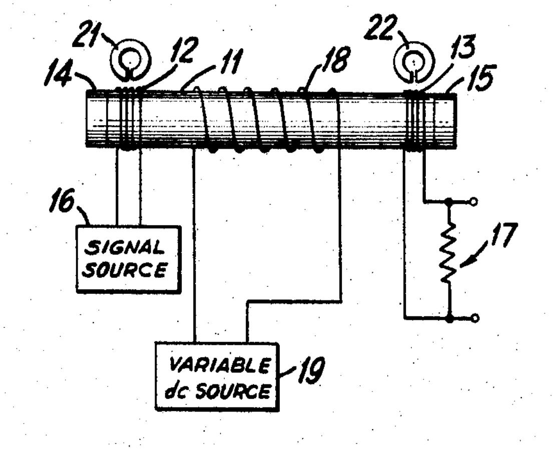
FIG. 1 is a schematic side view of a first embodiment of the invention.

Referring now to FIG. 1, there is shown a variable delay device comprising a nickel delay rod 11 having wound at the respective ends thereof a first coil 12, serving as an exciter transducer, and a second coil 13, serving as an elastic-wave pick-up. Dummy loads 14 and 15 are attached to both the ends of the rod 11 to prevent reflections and permanent magnets 21 and 22 are provided adjacent to the coils 12 and 13 for well-known biassing purpose. The electric signal to be delayed (for example a video signal) is applied from its source 16 to the first coil 12, which in turn excites the rod 11 and hence converts the electric energy to an elastic wave to be propagated by the rod 11. In case a substantially pure longitudinal wave is desired, the whole end surface of the rod 11 should be excited substantially in phase, whereas excitation should be taken place only along a diameter of the end surface or only at a small central area thereof in case the near-cut-off-wavelength effect is desired. The second coil 13 converts the elastic wave back to an output electric signal, which has been delayed by the propagation time of the elastic wave, and is available at output circuit 17. Delay variability is introduced by a delay-adjusting coil 18, wound about the central portion of the rod 11, and fed by a variable DC source 19 which in conjunction with the coil 18 impresses a magnetic field in the nickel rod.

Figure 2:
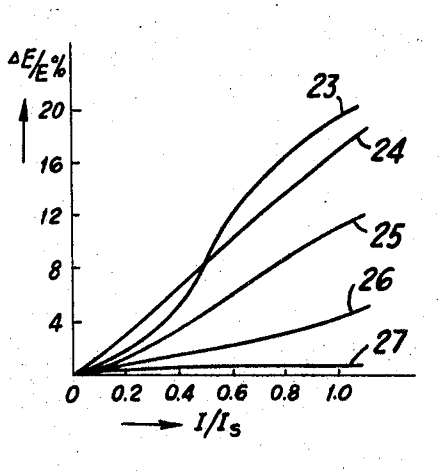
FIG. 2 illustrates explanatory characteristic curves for the embodiment of FIG. 1.

When a magnetic field is applied to the nickel rod 11, by the aforementioned means, Young's modulus of the rod 11 varies as illustrated in FIG. 2; where the abscissa is the ratio $I/I_S$ of magnetization current to the saturation magnetization current and the ordinate represents the percent increment $\Delta E/E$ of Young's modulus.

The curves 23 and 24 show the results obtained when rod 11 is maintained at 200° C. and 24° C., respectively. In either case, the variation $\Delta E/E$ of the elastic constant may be as large as approximately 17% when the magnetization current approaches saturation from zero. It follows from Equation 3, in case the elastic wave is propagated in the form of substantially pure longitudinal wave, that when the variation in Young's modulus amounts to 17%, the variation in the delay T is approximately 8% because the density *d* remains substantially unchanged. In addition, the variation is immediately responsive. More particularly, the response time is of the order of several milliseconds depending upon the time constant of the delay-adjusting coil.

Thus since a large amount of delay is obtainable with even a small delay rod (for example, a forty centimeter nickel rod will introduce a hundred microsecond delay) a relatively large variation in delay is possible (up to 8 microseconds in the example given). An even greater variation excursion is possible by merely lengthening the delay rod 11. Therefore, it is easy to rapidly provide a variation of ten microseconds in the amount of delay by varying the current of the field producing source 19. This amount of variation in delay is adequate to compensate for jitter in a rotating tape head; compensation which has heretofore been considered almost impossible. The saturation magnetization for a nickel block is of the order of several-thousand gausses.

The direction of the impressed magnetic field need not necessarily be that illustrated in FIG. 1, but may be perpendicular or oblique to the axis of the rod 11, since a variation of Young's modulus is inevitably reduced. While the electric signal to be delayed is shown applied directly to the first coil 12, (this, however, is not applicable when use is made of the near-cut-off-wavelength effect and of elastic wave whose frequency range does not lie near the cut-off wavelength). As the remedy therefor, it may be used to modulate a carrier wave having a frequency lying near cut-off frequency with the input electric signal, and then apply the modulated carrier to the coil 12. It is then of course necessary to demodulate the output.

In the variable delay device shown in FIG. 1, it is preferable either to apply to the delay-adjusting coil 18 a DC biassing current on which a DC delay-adjusting current is superimposed or to utilize residual magnetization, in order to bias the operating point of the rod 11 to such a point where the characteristic curves as shown in FIG. 2, particularly by the curve 23, has steeper slope. Instead of using the magnets 21 and 22, direct current may be superimposed on the signal current flowing through the first and second coils 12 and 13. Actually, the coils 12 and 13 themselves may be replaced with any other type ultrasonic exciter and vibration-pick-up means (such as resonators of titanate ceramic) which will fulfill the transducer requisites.

Although annealed nickel operated at 200° C. is preferable for the delay rod material because of its large $\Delta E/E$ increment, it is yet possible to use the rod 11 at other operation temperatures including room temperature. The nickel rod 11 is preferably annealed at 700° C.–1300° C., for several minutes to hours, and in air or in any other atmospheric and cooled through natural cooling. For example, a nickel rod may be heated in air up to about 1000° C. for an hour by causing electric current flow therethrough and then left to cool down with the current switched off. Use may also be made of other ferromagnetic materials which are subjected to suitable heat-treatment may also be employed. The characteristics of 68-permalloy subjected to rapid and slow cooling are shown by the curves 25 and 26, respectively. Ferrites of low attenuation characteristics which exhibit a relatively large variation in $\Delta E/E$ in response to the applied magnetic field, may also be used as the delay element 11. Curve 27 of FIG. 2 is an example of the poor results obtainable with annealed iron which exhibits a $\Delta E/E$ variation of the order of $10^{-4}$ of the total delay.

In order to reduce the required magnetization, the delay line 11 may be lengthened. On the other hand, the delay device itself may be reduced in size by shaping the delay element 11 into a helical, a spiral or a zig zag form, or when use is made of the tortional mode of propagation. The effective amount of delay may also be augmented by using a delay rod loaded with a number of discs. Furthermore, the delay-adjunting coil 18 may be replaced with any other means for generating a magnetic field.

Figures 3, 4:
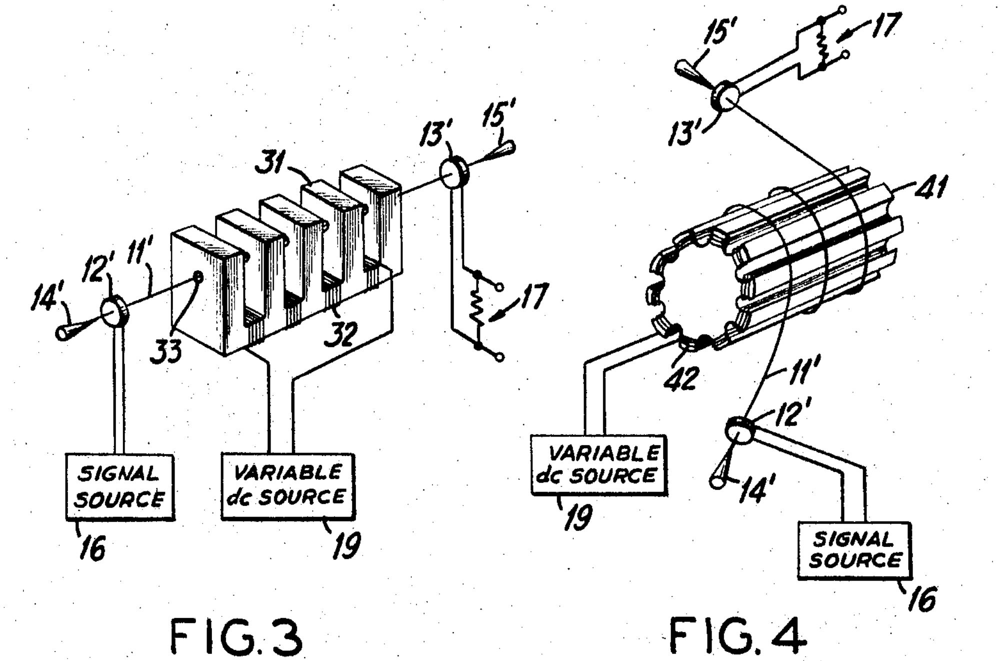
FIGS. 3 and 4 are schematic perspective views of a first and a second modification of the first embodiment, respectively.

FIGS. 3 and 4 show modifications of the delay device of FIG. 1. In these and subsequent figures, similar elements are denoted by similar reference characters; the primes designating modified shapes to adapt to the change in form of the embodiment. In the device of FIG. 3, the variable magnetic field is supplied by means of magnetic poles 31 of a rectangular-vane-line like structure, which has a delay-adjusting coil 32 at the root thereof. The delay line or wire 11' is threaded through the aligned perforations 33 in the magnetic poles. The device of FIG.

4 comprises a magnetic-field applying member 41, of motor-armature shape, associated with the delay-adjusting coil 42, around whose surface the delay line 11' is wound helically. Members 31 and 41 are of course constructed of low residual induction core material. In these devices the generated magnetic fields are greater than that of the FIG. 1 device, and accordingly the delay can be varied by a greater amount.

Figure 5:
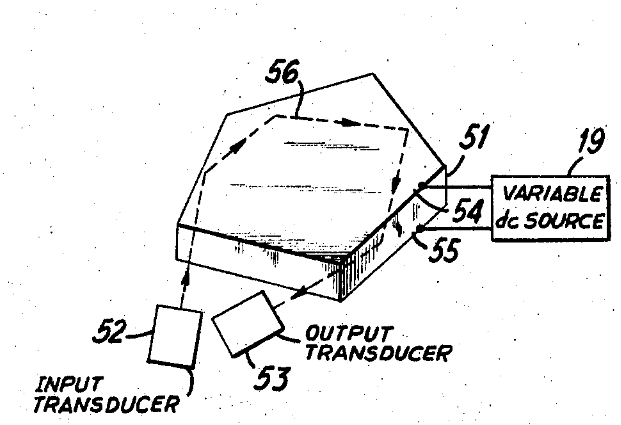
FIG. 5 is a schematic perspective view of a second embodiment of the invention.

In the device of FIG. 5, use is made not of a ferromagnetic substance but of a ferroelectric, piezoelectric, or the like substance for forming the delay device of the invention. In this second embodiment, an input transducer 52 converts the electric signal to be delayed into an elastic wave (for example an ultrasonic wave), which is subsequently reconverted to an electric signal by the output transducer 53. The delay piece 51 is composed of barium titanate, ADP (ammonium dihydrogen phasphate), NDP (potassium dihydrogen phasphate), Rochelle salt, or the like, and has electrodes 54 and 55 covering each of the opposite surfaces. A variable voltage source 19 is connected between the electrodes 54 and 55 for controlling the delay time. The input transducer 52 sends in the preselected direction the ultrasonic wave into the delay piece 51, which causes the ultrasonic wave to propagate from the input transducer 52 through the multi-reflection path 56 to the output transducer 53. A variation in the voltage applied to the piece 51 causes a variation in the elastic constant of the piece 51 and hence of the propagation speed of the ultrasonic wave, with the result that delay given to the electric signal varies. The piece 51 may be either formed for a multi-reflection path or a single reflection. Further, the applied electric field need not necessarily be perpendicular to the plane of the piece 51. While the transducers 52 and 53 are shown detached from the piece 51 for the purpose of simplicity of illustration, it may prove desirable to attach them directly to the side wall of the piece 51. It should be also noted that means, such as rubber pieces, must be used for reducing reflection of the ultrasonic wave, while they are omitted in the figure for simplicity of illustration.

Figure 7:
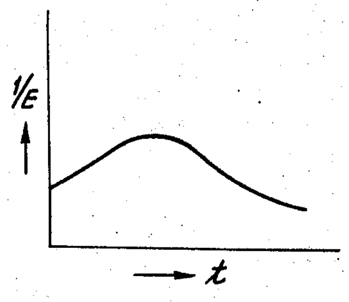
FIG. 7 shows a characteristic curve for explaining the principle of the third embodiment.
Figure 6:
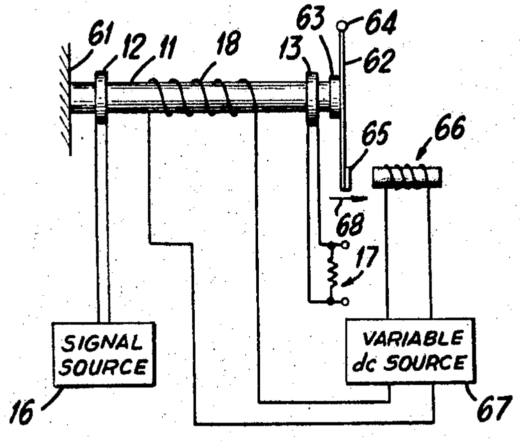
FIG. 6 is a schematic side view of a third embodiment of the invention.

In FIG. 6, a third embodiment of the invention is shown which employs a delay rod 11 associated with the first, the second, and delay-adjusting coils 12, 13 and 18 in the manner explained with reference to FIG. 1 A fixed dummy load 61 is rigidly attached to one end of the rod 11, and a lever 62 is attached by means of another dummy load 63 to the other end of the rod. The lever 62 is supported at one end by a fulcrum 64 and is provided at the other end with an iron piece 65 associated with an electromagnet 66 controlled by an adjustable current source 67. Control current is applied from the source 67 to the electromagnet 66 in order to subject the rod 11 to tension in the direction of the arrow 68 (via the lever arm) thereby varying the delay. As may be seen from FIG. 7 where the abscissa is the tension *t* and the ordinate represents the inverse of Young's modulus E, a variation in tension applied to the delay line 11 causes a resultant variation in the elastic constant of the delay line 11, and consequently in the delay. Preferably, the iron piece 65 and the electromagnet 66 are spaced in such a manner that the iron piece 65 is movable within the gap but never contacts the electromagnet 66. Although it is possible to control the delay by merely the variation in the mechanical stress (causing a variation in Young's modulus of as much as 20%), a greater effect can be expected by adding a variation in the magnetic field applied to the delay rod 11. When subjetced to magnetization and tension simultaneously, the delay rod 11 shows a variation in Young's modulus amounting to approximately 35% and provides a variation in the amount in delay (from Equation 3) approximating 20%. For this simultaneous effect, the control current from the source 67 is also supplied, as shown in the figure, to the delay-adjusting coil 18 so that the magnetic field may also be applied to the rod 11. In this connection, the phase relation between the currents applied to the electromagnet 66 and the coil 18 is preadjusted in the source 67 so as to add the resultant variations in delay mutually. Naturally, instead of the electromagnet 66, either a spring or a weight may be used as the means for applying mechanical stress.

Figure 8:
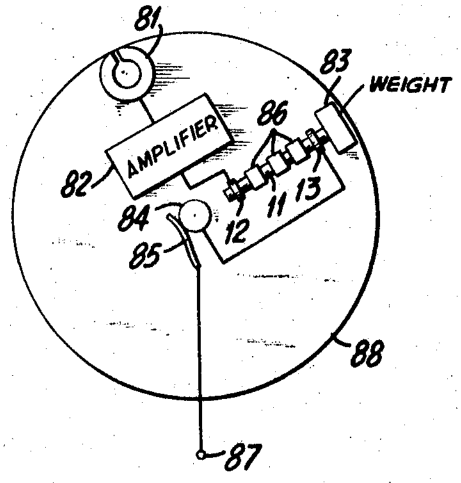
FIG. 8 shows an example of the application of the invention.

Finally, FIG. 8 shows an exemplary use of the invention to compensate for the jitter in the rotating head of a video tape recorder. Tape head 81 energizes (on reproduction) or is energized (on recording) by, via amplifier or Modulator 82, the first coil 12 of the delay rod 11. A lead wire extends from the second coil 13 through a slip ring 84 and a brush 85, to the exterior terminal 87 of the device through which signals are derived from the head 81 on reproduction and are supplied thereto on recording. The delay rod 11 is fixed at its left end to a head-supporting member 88 and has affixed at its right end a weight 83 for increasing the tension applied to the rod 11 by the centrifugal force inherent in the rotating head; hence making the delay increase, with increased rotational speed and decrease with decreased rotational speed (the operating point on the characteristic curve being selected to effect this result) thereby automatically compensating for head speed variations. Permanent magnets 86 which is of hollow cylindrical shape with axial magnetization serve to augment the sensitivity by their magnetic fields. Suitable weights must of course be added to compensate for the eccentricity imposed on the center of gravity by the delay device.

The variable delay device of the invention may also be utilized for providing a variable-frequency oscillator by incorporating it in the positive feedback circuit; the oscillating frequency varying with the amount of delay in the delay device. Such an oscillator may then be utilized as a part of a stabilized FM carrier generator, wherein a standard frequency generator signal is compared with the frequency of the oscillator and the amount of delay in the delay device is adjusted in response to the difference between these two frequencies.

While I have described above the principles of my invention in connection with specific apparatus, it is to be clearly understood that this description is made only by way of example and not as a limination to the scope of my invention as set forth in the objects thereof and in the accompanying claims.

I claim:

1. A variable delay device comprising a ferromagnetic elongated member for propagating an elastic wave, input means for launching an elastic wave in said member, output means disposed along the propagation path of said wave for deriving the elastic wave, means for impressing a magnetic field upon said member intermediate the input and output means for varying the elastic constant of the member, said member being rigidly mounted with effective cantilever fashion and a mechanical member attached to the free end of the cantilever-mounted member for varying the stress of said elongated member.

2. The variable delay device claimed in claim 1 and further comprising electromagnetic means for attracting said mechanical member in a direction tending to subject said elongated member to varying stress.

References Cited

UNITED STATES PATENTS 2,814,793 11/1957 Bonn ............... 333—30

ROY LAKE, *Primary Examiner.*

D. R. HOSTETTER, *Assistant Examiner.*

U.S. Cl. X.R.

178—6.6; 179—100.2